US009355256B2

(12) United States Patent  (10) Patent No.: US 9,355,256 B2
Chari et al. (45) Date of Patent: May 31, 2016

(54) SANITIZATION OF VIRTUAL MACHINE IMAGES

(71) Applicant: International Business Machines Corporation, Armonk, NY (US)

(72) Inventors: Suresh N. Chari, Tarrytown, NY (US); Ashish Kundu, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 13/950,014

(22) Filed: Jul. 24, 2013

(65) Prior Publication Data

US 2015/0033221 A1   Jan. 29, 2015

(51) Int. Cl.
  *G06F 21/60* (2013.01)
  *G06F 21/53* (2013.01)
  *G06F 9/455* (2006.01)
  *H04L 29/06* (2006.01)

(52) U.S. Cl.
  CPC ............ *G06F 21/60* (2013.01); *G06F 9/45558* (2013.01); *G06F 21/53* (2013.01); *H04L 63/105* (2013.01); *G06F 2009/45587* (2013.01); *G06F 2221/2113* (2013.01); *G06F 2221/2149* (2013.01)

(58) Field of Classification Search
  CPC .................................................. G06F 9/45533
  USPC ............................................................. 718/1
  See application file for complete search history.

(56) References Cited

U.S. PATENT DOCUMENTS

| | | | |
|---|---|---|---|
| 6,002,409 A * | 12/1999 | Harkin ........................... | 345/506 |
| 8,011,010 B2 | 8/2011 | Michael et al. | |
| 8,654,050 B2 | 2/2014 | Ueki et al. | |
| 8,954,050 B2 * | 2/2015 | Deasy et al. .................. | 455/419 |
| 2007/0234337 A1 | 10/2007 | Suzuki et al. | |
| 2009/0228587 A1 * | 9/2009 | Chagoly ............. | G06F 11/3495 709/224 |
| 2009/0235358 A1 * | 9/2009 | Tolba .............................. | 726/24 |
| 2012/0084769 A1 | 4/2012 | Adi et al. | |
| 2012/0167209 A1 * | 6/2012 | Molnar et al. .................. | 726/22 |
| 2013/0031595 A1 * | 1/2013 | Nevstruev et al. ................ | 726/1 |
| 2013/0167192 A1 * | 6/2013 | Hickman et al. .................. | 726/1 |
| 2013/0198815 A1 * | 8/2013 | Piliouras ........................... | 726/4 |

(Continued)

OTHER PUBLICATIONS

Gutmann, "Secure Deletion of Data from Magnetic and Solid-State Memory", Proceedings of the Sixth USENIX Security Symposium, Jul. 1996, 18 pages.

(Continued)

*Primary Examiner* — Emerson Puente
*Assistant Examiner* — Charlie Sun
(74) *Attorney, Agent, or Firm* — Yee & Associates, P.C.; Jeffrey S. LaBaw

(57) ABSTRACT

Sanitizing a virtual machine image of sensitive data is provided. A label for a sensitivity level is attached to identified sensitive data contained within each software component in a plurality of software components of a software stack in a virtual machine image based on labeling policies. In response to receiving an input to perform a sanitization of the identified sensitive data having attached sensitivity level labels contained within software components of the software stack in the virtual machine image, the sanitization of the identified sensitive data having the attached sensitivity level labels contained within the software components of the software stack in the virtual machine image is performed based on sanitization policies.

10 Claims, 10 Drawing Sheets

(56) References Cited

U.S. PATENT DOCUMENTS

2014/0283089 A1* 9/2014 Arya .............................. 726/26
2015/0033223 A1 1/2015 Chari et al.

OTHER PUBLICATIONS

Gutmann, "Data Remanence in Semiconductor Devices", Proceedings of the 10th USENIX Security Symposium, Aug. 2001, 19 pages.

Halderman et al., "Lest We Remember: Cold Boot Attacks on Encryption Keys", Proceedings of the 17th USENIX Security Symposium, Jul. 2008, 16 pages.

Samyde et al., "On a New Way to Read Data from Memory", Proceedings of the First International IEEE Security in Storage Workshop, Dec. 2002, pp. 65-69.

Skorobogatov, "Data Remanence in Flash Memory Devices", Cryptographic Hardware and Embedded Systems—CHES 2005, Lecture Notes in Computer Science vol. 3659, Sep. 2005, pp. 339-353.

Skorobogatov, "Low Temperature Data Remanence in Static RAM", University of Cambridge Computer Laboratory Technical Report No. 536, Jun. 2002, 9 pages.

Office Action, dated Jul. 8, 2015, regarding U.S. Appl. No. 13/964,770, 32 pages.

Office Action, dated Nov. 6, 2015, regarding U.S. Appl. No. 13/964,770, 25 pages.

Notice of Allowance, dated Mar. 9, 2016, regarding U.S. Appl. No. 13/964,770, 12 pages.

Chari, et al., "Sanitization of Virtual Machines," U.S. Appl. No. 15/086,228, filed Mar. 31, 2016, 45 pages.

Chari, et al., "Sanitization of Virtual Machines," U.S. Appl. No. 15/086,290, filed Mar. 31, 2016, 47 pages.

* cited by examiner

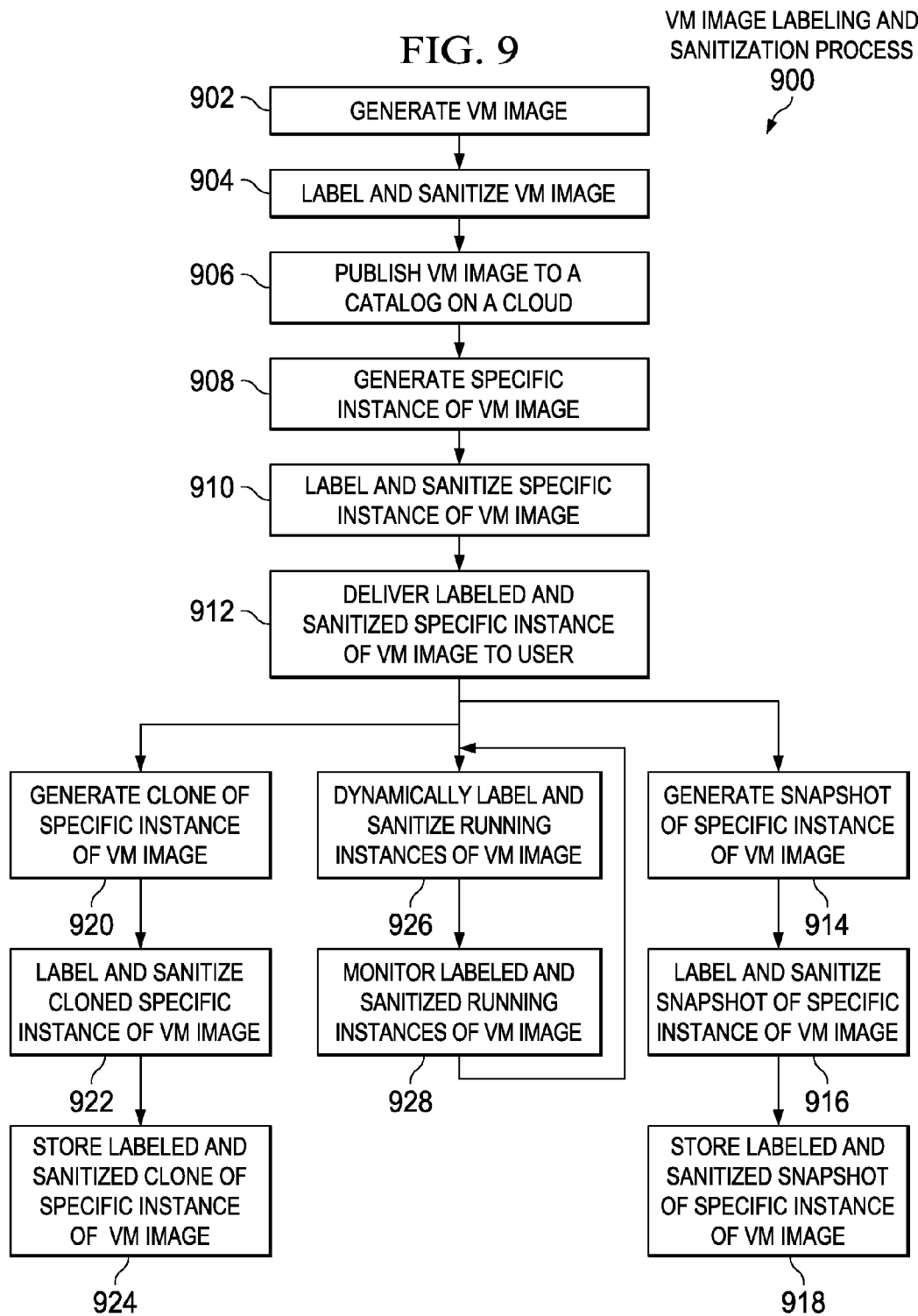

SANITIZATION OF VIRTUAL MACHINE IMAGES

BACKGROUND

1. Field

The disclosure relates generally to virtual machines and more specifically to sanitizing a virtual machine image of sensitive data contained within a plurality of different software components of a software stack installed on the virtual machine image.

2. Description of the Related Art

The concept of virtual machines has been used in computing for decades. For example, mainframe computers take advantage of their computing power by running multiple instances of the same or different operating systems within multiple virtual machines on the same computer. Virtual machines are desirable due to their ability to isolate specific applications, tasks, or users. For example, an individual wanting to manage his or her personal finances may use a virtual machine that is specifically equipped with personal accounting software and a variety of sensitive personal finance data associated with that individual. Virtual machines are typically stored as a set of files.

SUMMARY

According to one illustrative embodiment, a computer-implemented method for sanitizing a virtual machine image of sensitive data is provided. A computer attaches a sensitivity level label to identified sensitive data contained within each software component in a plurality of software components of a software stack in a virtual machine image based on labeling policies. In response to the computer receiving an input to perform a sanitization of the identified sensitive data having attached sensitivity level labels contained within software components of the software stack in the virtual machine image, the computer performs the sanitization of the identified sensitive data having the attached sensitivity level labels contained within the software components of the software stack in the virtual machine image based on sanitization policies. According to other illustrative embodiments, a computer system and a computer program product for sanitizing a virtual machine image of sensitive data also are provided.

BRIEF DESCRIPTION OF THE SEVERAL VIEWS OF THE DRAWINGS

FIG. 9 is a diagram illustrating an example of a virtual machine image labeling and sanitization process in accordance with an illustrative embodiment.

DETAILED DESCRIPTION

Figure 1:
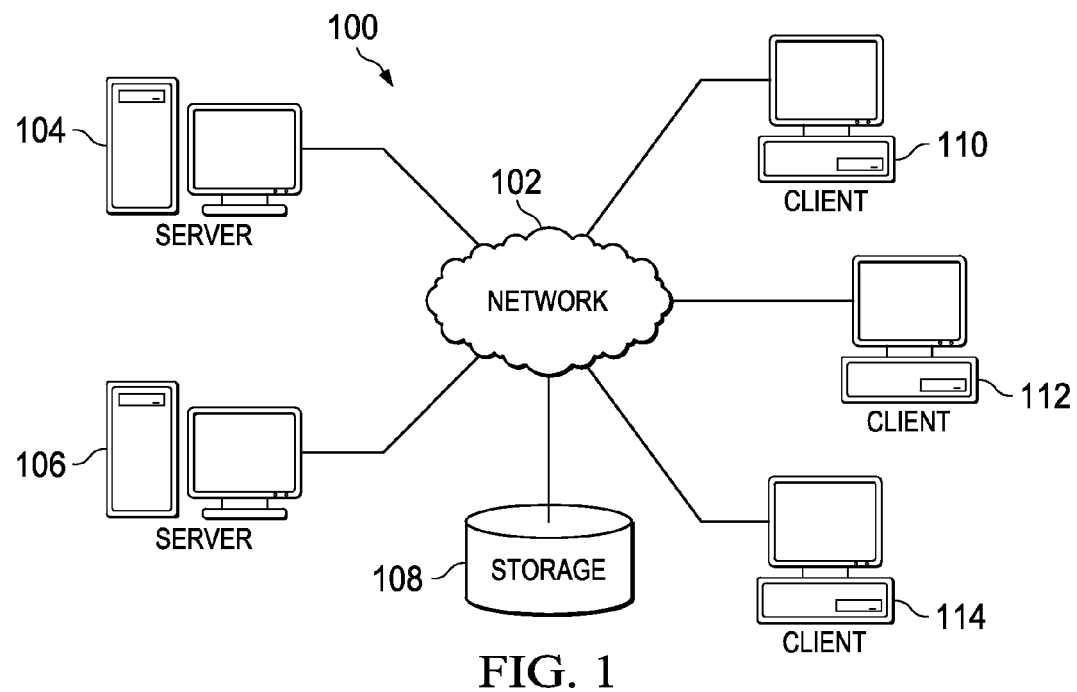
FIG. 1 is a pictorial representation of a network of data processing systems in which illustrative embodiments may be implemented.

As will be appreciated by one skilled in the art, aspects of the illustrative embodiments may be embodied as a computer system, computer-implemented method, or computer program product. Accordingly, aspects of the illustrative embodiments may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can store a program for use by or in connection with an instruction execution system, apparatus, or device. In addition, a computer readable storage medium excludes all propagation media, such as signals and carrier waves.

A computer readable signal medium may include a propagated data signal with computer readable program code embodied therein, for example, in baseband or as part of a carrier wave. Such a propagated signal may take any of a variety of forms, including, but not limited to, electro-magnetic, infra-red, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of computer-implemented methods, computer systems, and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other data processing devices in which the illustrative embodiments may be implemented. Network data processing system 100 contains network 102, which is the medium used to provide communications links between the computers and the other data processing devices connected together within network data processing system 100. Network 102 may include connections, such as wire communication links, wireless communication links, or fiber optic cables.

In the depicted example, server 104 and server 106 connect to network 102, along with storage 108. Server 104 and server 106 may be, for example, server computers with high-speed connections to network 102. In addition, server 104 and/or server 106 may provide one or more services to client devices connected to network 102. For example, server 104 and/or server 106 may generate and manage a plurality of different virtual machine (VM) images for the client devices.

A virtual machine image is a software implementation of a computing environment in which a guest operating system (OS) can be installed and run. A virtual machine image typically emulates a physical computing environment, but requests for central processing unit (CPU), memory, hard disk drive, network interface card, and other hardware resources are managed by a virtualization layer that translates these requests to the underlying physical hardware. Virtual machines are generated within a virtualization layer, such as a virtual machine manager or hypervisor that runs on top of an operating system. This operating system is known as the host operating system, as opposed to the guest operating systems running in the different virtual machine images. The virtualization layer can be used to create many individual, isolated virtual machine images.

Clients 110, 112, and 114 also connect to network 102. Clients 110, 112, and 114 are clients to server 104 and/or server 106. In the depicted example, server 104 and/or server 106 may provide information, such as boot files, operating system images, and applications to clients 110, 112, and 114. Users of clients 110, 112, and 114 may utilize clients 110, 112, and 114 to access the services provided by server 104 and/or server 106.

Clients 110, 112, and 114 may be, for example, mobile data processing systems, such as cellular telephones, smart phones, personal digital assistants, gaming devices, or handheld computers, with wireless communication links to network 102. In addition, clients 110, 112, and 114 may be personal computers, network computers, set-top boxes, and/or portable computers, such as laptop computers, with wire and/or wireless communication links to network 102. It should be noted that clients 110, 112, and 114 may represent any combination of computers and mobile data processing systems connected to network 102.

Storage 108 is a network storage device capable of storing data in a structured or unstructured format. Storage 108 may provide, for example, storage of: a plurality of different virtual machine images; names and identification numbers of a plurality of users; and account information associated with each of the plurality of users. Furthermore, storage unit 108 may store other data, such as authentication or credential data that may include user names, passwords, and/or biometric data associated with the plurality of users and/or system administrators.

Also, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
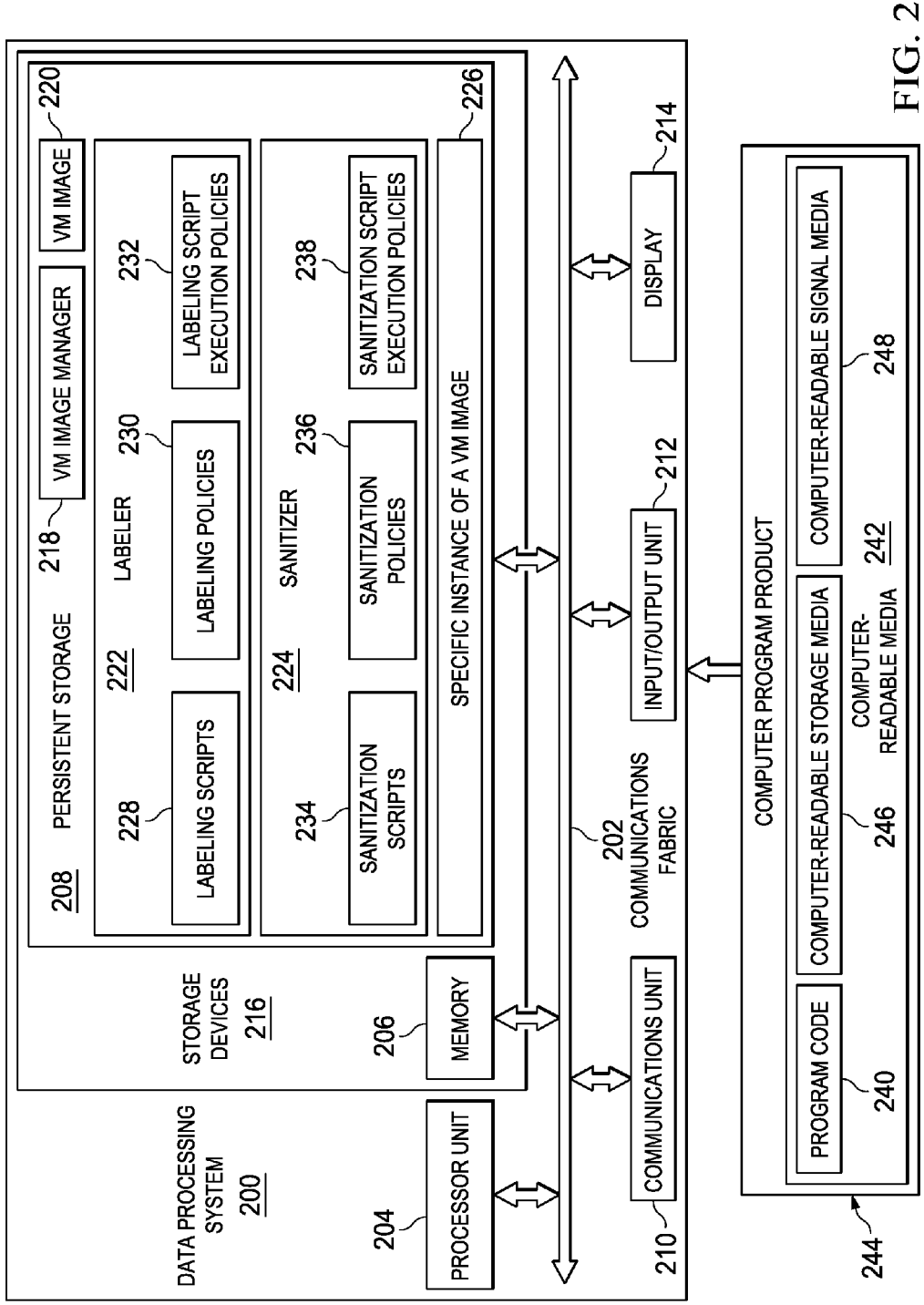
FIG. 2 is a diagram of a data processing system in which illustrative embodiments may be implemented.

With reference now to FIG. 2, a diagram of a data processing system is depicted in which illustrative embodiments may be implemented. Data processing system 200 is an example of a computer, such as server 104 or client 110 in FIG. 1, in which computer readable program code or instructions implementing processes of illustrative embodiments may be located. In addition, data processing system 200 may be implemented in a distributed cloud computing environment where tasks are performed by remote devices linked via a communication network, such as network 102 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium, such as a signal or carrier wave. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores virtual machine image manager 218, virtual machine image 220, labeler 222, sanitizer 224, and specific instance of a virtual machine image 226. However, it should be noted that persistent storage 208 may store any program, application, module, and/or data that the different illustrative embodiments may utilize. Virtual machine image manager 218 is a software application that generates virtual machine images, such as virtual machine image 220, and then manages the lifecycle of the generated virtual machine images.

Virtual machine image manager 218 inserts labeler 222 and sanitizer 224 in each virtual machine image that virtual machine image manger 218 generates. In other words, virtual machine image manager 218 instruments each virtual machine image with labeler 222 and sanitizer 224. Labeler 222 and sanitizer 224 may be, for example, extensions of the Open Visualization Format (OVF), which defines an open, secure, portable, and extensible format for the packaging and distribution of software to be run in virtual machines. In addition, virtual machine image manager 218 may, for example, insert labeler 222 and sanitizer 224 into each layer of the virtual machine image's software stack. For example, virtual machine image manager 218 may insert labeler 222 and sanitizer 224 into an application layer, a middleware layer, a guest operating system layer, and a virtual storage layer of a software stack of a virtual machine image. Alternative illustrative embodiments may include labeler 222 and sanitizer 224 within virtual machine image manager 218.

Labeler 222 is a software module that labels sensitive data contained within virtual machines. Sensitive data is information that a user of a virtual machine does not want to be made public or made available to other users after the user has finished using the virtual machine. Types of sensitive data that may be contained within a virtual machine may be, for example, passwords, credit card numbers, social security numbers, bank account numbers, cryptographic keys, user-generated data, user history data, and paths to locations of the sensitive data.

Labeler 222 includes labeling scripts 228, labeling policies 230, and labeling script execution policies 232. Labeling scripts 228 are programming language scripts, such as Perl scripts, Python scripts, or shell scripts, that labeler 222 uses to identify and label sensitive data contained within a virtual machine based on labeling policies 230. Labeling policies 230 define which sensitive data contained within a virtual machine are to be labeled and at which sensitivity level. For example, labeling policies 230 may define that passwords are sensitive data to be labeled within a virtual machine and that a high sensitivity level label is to be attached to the passwords. As further examples, labeling policies 230 also may define that system logs or paths to locations of sensitive data contained within a virtual machine are to be assigned a medium sensitivity level label and that user history data contained within a virtual machine are to be assigned a low sensitivity level label. Labeling script execution policies 232 define an order of execution of labeling scripts 228 based on (1) labeling dependencies between different software components and data items being labeled within a virtual machine's software stack and/or (2) dependency of one script on a successful or failed execution on another script or for some other reason. The order of execution of labeling scripts may be represented by a partial order, for example, by a directed acyclic graph (DAG) in labeling script execution policies 232.

Sanitizer 224 is a software module that sanitizes labeled sensitive data contained within virtual machines. Sanitization is the process of removing the labeled sensitive data from the virtual machines so that the labeled sensitive data is no longer available or retrievable within the virtual machines. Sanitizer 224 includes sanitization scripts 234, sanitization policies 236, and sanitization script execution polices 238.

Sanitization scripts 234 also may be programming language scripts, such as, for example, Perl scripts, Python scripts, or shell scripts, that sanitizer 224 uses to identify and sanitize labeled sensitive data contained within a virtual machine based on sanitization policies 236. Sanitization policies 236 define which sanitization actions are to be performed on which labeled sensitivity data contained within a virtual machine. For example, sanitization policies 236 may define that passwords and cryptographic keys having an attached high sensitivity level label within a virtual machine are to be deleted. As further examples, sanitization policies 236 also may define that system logs or paths to locations of sensitive data having an attached medium sensitivity level label contained within a virtual machine are to be encrypted and that user history data having an attached low sensitivity level label contained within a virtual machine are to be overwritten with a particular value. Sanitization script execution polices 238 define an order of execution of sanitization scripts 234 based on (1) dependencies between different software components and data items being sanitized with a virtual machine's software stack and/or (2) dependency of one script on a successful or failed execution on another script or for some other reason. The order of execution of sanitization scripts may be referred to as a directed acyclic graph.

Specific instance of a virtual machine image 226 is a specific instance of a virtual machine that virtual machine image manager 218 generated based on input by a particular user to perform a set of one or more functions or tasks within the cloud computing environment. In other words, specific instance of a virtual machine image 226 is associated with one particular user and may contain sensitive data that the particular user does not want to be accessible by other users.

Communications unit 210, in this example, provides for communication with other data processing systems and computing devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user. In addition, display 214 may provide touch screen capabilities.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 240 is located in a functional form on computer readable media 242 that is selectively removable and may be loaded onto or transferred to data processing system 200 for running by processor unit 204. Program code 240 and computer readable media 242 form computer program product 244. In one example, computer readable media 242 may be computer readable storage media 246 or computer readable signal media 248. Computer readable storage media 246 may include, for example, an optical or magnetic disc that is inserted or placed into a drive or other device that is part of persistent storage 208 for transfer onto a storage device, such as a hard drive, that is part of persistent storage 208. Computer readable storage media 246 also may take the form of a persistent storage, such as a hard drive, a thumb drive, or a flash memory that is connected to data processing system 200. In some instances, computer readable storage media 246 may not be removable from data processing system 200.

Alternatively, program code 240 may be transferred to data processing system 200 using computer readable signal media 248. Computer readable signal media 248 may be, for example, a propagated data signal containing program code 240. For example, computer readable signal media 248 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 240 may be downloaded over a network to persistent storage 208 from another device or data processing system through computer readable signal media 248 for use within data processing system 200. For instance, program code stored in a computer readable storage media in a server data processing system may be downloaded over a network from the server to data processing system 200. The data processing system providing program code 240 may be a server computer, a client computer, or some other device capable of storing and transmitting program code 240.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 246 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
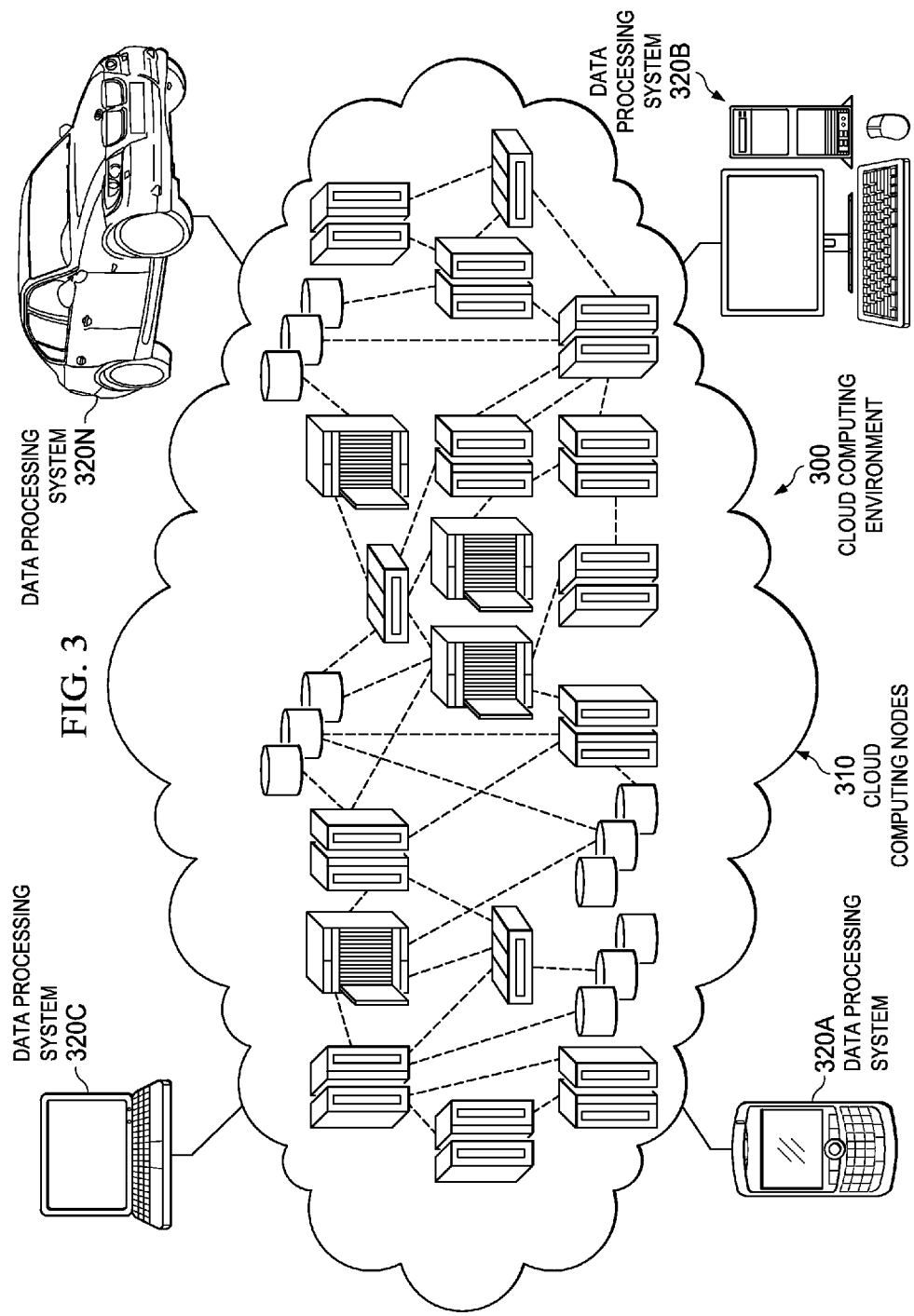
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which data processing systems of users of cloud computing environment 300 may communicate. Cloud computing nodes 310 may be, for example, server 104 and server 106 in FIG. 1. Data processing systems that communicate with cloud computing nodes 310 include data processing system 320A, which may be a personal digital assistant (PDA) or a smart phone, data processing system 320B, which may be a desktop computer or a network computer, data processing system 320C, which may be a laptop computer, and data processing system 320N, which may be a computer system of an automobile. Data processing systems 320A-320N may be, for example, clients 110-114 in FIG. 1.

Cloud computing nodes 310 may communicate with one another and may be grouped physically or virtually into one or more cloud computing networks, such as a private cloud computing network, a community cloud computing network, a public cloud computing network, or a hybrid cloud computing network. This allows cloud computing environment 300 to offer infrastructure, platforms, and/or software as a service to users without requiring the users to maintain these resources on their local data processing systems, such as data processing systems 320A-320N.

Cloud computing is a model of a service delivery system, which enables convenient, on-demand network access to a shared pool of configurable computing resources, such as, for example, networks, network bandwidth, servers, processing, memory, storage, applications, virtual machines, and services that may be rapidly provisioned and released with minimal interaction with a provider of the service. A private cloud computing network is a cloud infrastructure that is operated solely for an organization. The private cloud computing network may be managed by the organization or a third party and may exist on-premises or off-premises. A community cloud computing network is a cloud infrastructure that is shared by several organizations and supports a specific community that has shared concerns, such as, for example, mission, security requirements, policy, and compliance considerations. The community cloud computing network may be managed by the organizations or a third party and may exist on-premises or off-premises. A public cloud computing network is a cloud infrastructure that is made available to a general public or a large industry group and is owned by an organization selling cloud services. A hybrid cloud computing network is a cloud infrastructure that is a composition of two or more types of clouds, such as private, community, and/or public clouds, which remain unique entities, but are bound together by standardized or proprietary technology that enables data and application portability and service interoperability.

Software as a Service (SaaS) provides the capability to a user to utilize a provider's applications running on a cloud infrastructure. The applications are accessible from various data processing system devices through a client interface, such as a web browser. The user does not manage or control the underlying cloud infrastructure including network, servers, operating systems, storage, and individual application capabilities with the exception of limited user-specified application configuration settings. Platform as a Service (PaaS) provides the capability to a user to deploy onto a cloud infrastructure user-created or user-acquired applications created using programming languages and tools supported by the provider of the service. The user does not manage or control the underlying cloud infrastructure including networks, servers, operating systems, and storage, but has control over the deployed applications and possibly application hosting environment configurations. Infrastructure as a Service (IaaS) provides the capability to a user to provision processing, storage, networks, and other fundamental computing resources where the user is able to deploy and run arbitrary software, which may include operating systems and applications. The user does not manage or control the underlying cloud infrastructure, but has control over operating systems, storage, deployed applications, and possibly limited control over select networking components, such as, for example, host firewalls.

Figure 4:
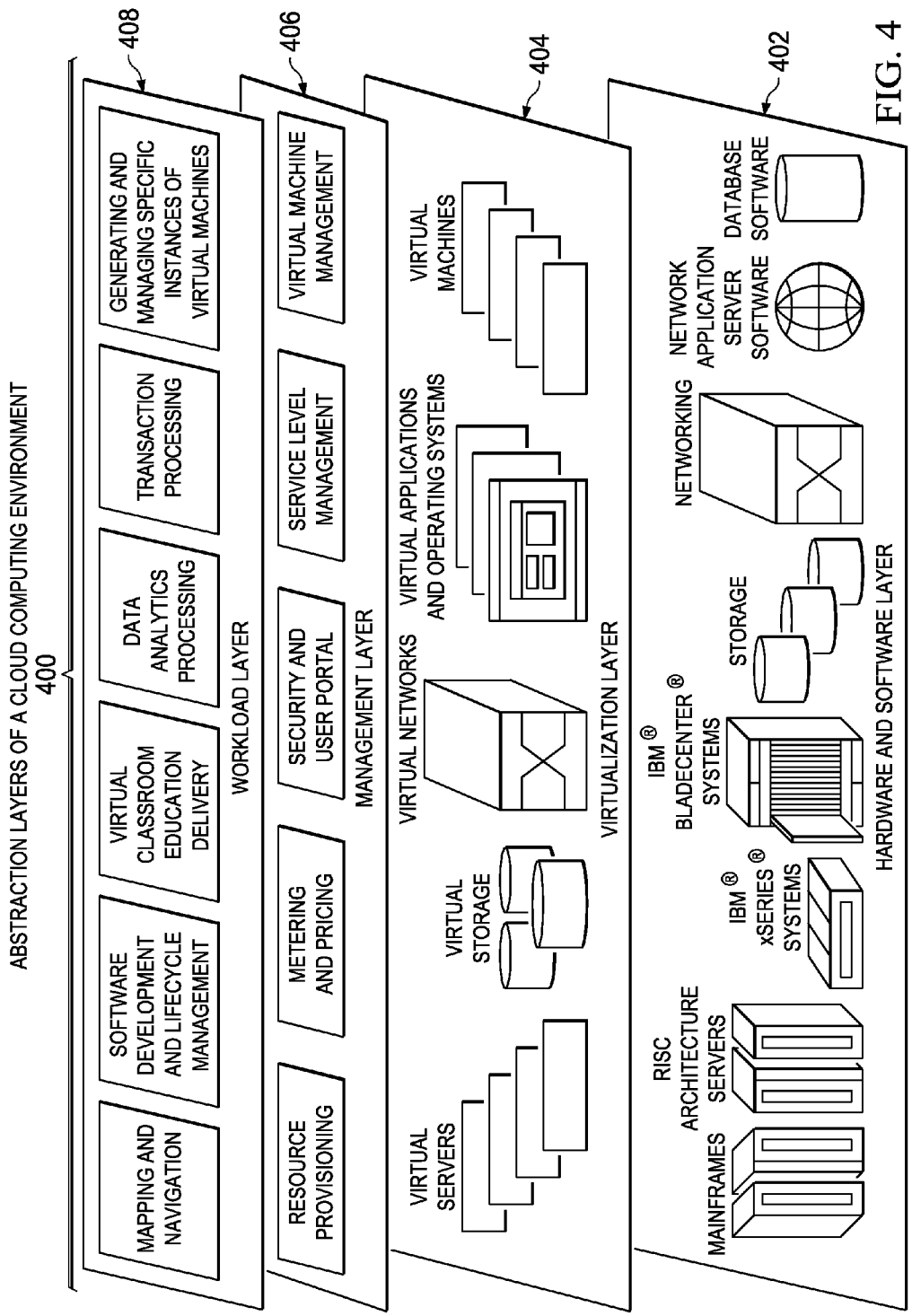
FIG. 4 is a diagram illustrating an example of abstraction layers of a cloud computing environment in accordance with an illustrative embodiment.

With reference now to FIG. 4, a diagram illustrating an example of abstraction layers of a cloud computing environment is depicted in accordance with an illustrative embodiment. The set of functional abstraction layers shown in this illustrative example may be implemented in a cloud computing environment, such as cloud computing environment 300 in FIG. 3. Also, it should be noted that the layers, components, and functions shown in FIG. 4 are intended to be examples only and not intended to be limitations on illustrative embodiments.

Abstraction layers of a cloud computing environment 400 includes hardware and software layer 402, virtualization layer 404, management layer 406, and workload layer 408. Hardware and software layer 402 includes the hardware and software components of the cloud computing environment. The hardware components may include, for example, IBM® zSeries® systems, RISC (Reduced Instruction Set Computer) architecture based servers, IBM® pSeries® systems, IBM® xSeries® systems, IBM® BladeCenter® systems, storage devices, network devices, and networking components. The software components may include, for example, network application server software, such as IBM® WebSphere® application server software, and database software, such as IBM® DB2® database software. IBM®, zSeries®, pSeries®, xSeries®, BladeCenter®, WebSphere®, and DB2® are trademarks of International Business Machines Corporation registered in many jurisdictions worldwide.

Virtualization layer 404 is an abstraction layer that generates virtual entities such as, for example, virtual servers, virtual storage, virtual networks, virtual applications and operating systems, and virtual machines. Management layer 406 may provide a plurality of different management functions, such as, for example, resource provisioning, metering and pricing, security and user portal, service level management, and virtual machine management. Resource provisioning dynamically procures computing resources and other resources, which are utilized to perform tasks within the cloud computing environment. Metering and pricing provide usage tracking as resources are utilized within the cloud computing environment and billing for consumption of these resources. Security provides identity verification for cloud users, as well as protection for data and other resources. User portal provides access to the cloud computing environment for users and system administrators. Service level management provides cloud computing resource allocation and management such that required service levels are met based on service level agreements. Virtual machine management provides management of virtual machine lifecycles, which may include sanitization of sensitive data contained within the virtual machines after use by users of the cloud computing environment. Workload layer 408 provides the functionality of the cloud computing environment. Example workloads provided by workload layer 408 may include mapping and navigation, software development and lifecycle management, virtual classroom education delivery, data analytics processing, transaction processing, and generating and managing specific instances of virtual machines.

In the course of developing illustrative embodiments, it was discovered that data remanence is a problem within cloud computing environments. Data remanence is the residual representation of sensitive data that remains after attempts are made to remove or erase the sensitive data. Data remanence in cloud computing environments may cause sensitive data leakage at all levels of a virtual machine's software stack and across almost all providers of services in the cloud computing environments. Data remanence is easy to exploit using a browser and a search engine. Data exposed via remanence may lead to intrusion of services using instances generated from those images directly or indirectly.

In cloud computing environments, shared infrastructure and services exist that utilize virtual machine images with corresponding virtual storage blocks. Vulnerabilities within the cloud computing environments may include virtual machine images that are not completely sanitized of the sensitive data after use. Threats to the cloud computing environments may include exposure of this sensitive data, such as user credentials (i.e., passwords), cryptographic keys, and access to and/or reconstruction of data within a file system. Business risks associated with the cloud computing environments may include intrusion, exposure of confidential and private business data, and software piracy.

Virtual machine images may contain substantial amounts of sensitive data belonging to a cloud computing environment, applications installed on the cloud computing environment, and users who have accounts on the cloud computing environment. Depending on the type of cloud computing environment and the applications and services that are installed, this sensitive data can include information at all layers of the cloud computing environment. Some examples are: raw information in virtual disk blocks; sensitive details in system configuration files including network topology information and administrator accounts and passwords; sensitive details in system logs, such as administrator passwords; application data, such as raw data in database files; and application credentials, such as default passwords for applications.

In a cloud computing environment where virtual machine images are cloned from master virtual machine images and copied to bring up other virtual machine instances, a possibility exists for sensitive data to persist across multiple virtual machine images leading to many privacy and confidentiality breaches. For instances, by bringing up an application after cloning from a master virtual machine image, the end-user risks running an application with the same default password. This may be used by malicious parties to compromise the application running on the cloned virtual machine image. Similarly, by allocating a storage block to a virtual machine image in a cloud computing environment, which is often a deallocated storage block of other virtual machine images, the end-user may be able to access the sensitive data.

Currently, this problem is not addressed in a complete manner. Currently, if the virtual machine images/instances are sanitized at all, a manual process is applied or an incomplete automatic process is applied, such as sanitizing only the passwords during the creation of virtual machine instances. As a result, sanitization methods currently used are adhoc and/or incomplete.

Illustrative embodiments utilize a markup-based language for specification of sensitive data contained with virtual machine images and sanitization directives for sanitizing the sensitive data contained within the virtual machine images. These specifications of sensitive data and sanitization directives may be extensions of the open virtualization format. Illustrative embodiments label sensitive data at each level of a virtual machine image's software stack, such as, for example, storage, guest operating system, middleware, and application levels. Illustrative embodiments sanitize virtual machine images based on the sanitization directives. Sanitization of virtual machine images is required for prevention of disclosure of sensitive data contained within virtual machine images and prevention of intrusion via default credentials.

The sanitization system of illustrative embodiments includes a labeler and a sanitizer. The labeler labels sensitive data with sensitivity level labels within a virtual machine image based on labeling policies. For example, the labeler may label system logs or secure data with a high sensitivity level label. This labeling information is embedded within a virtual machine image and/or within a label file that specifies labels in a specific format. The sanitizer sanitizes the virtual machine images of the sensitive data based on sanitization policies.

Thus, illustrative embodiments focus on scanning and sanitization of virtual machine images in a cloud computing environment in order to remove sensitive data contained within the virtual machine images, which are not malware or viruses. Illustrative embodiments may take one virtual machine image as an input, scan and sanitize the complete virtual machine image, and output more than one virtual machine image based on several policies, which then can be deployed to two or more users. Illustrative embodiments address the problem of how to scan and sanitize virtual machine images, which are already composed and bundled, so that the output is a virtual machine image with no sensitive data contained within it, in order to prevent data leakages and other security and privacy breaches.

Figure 5:
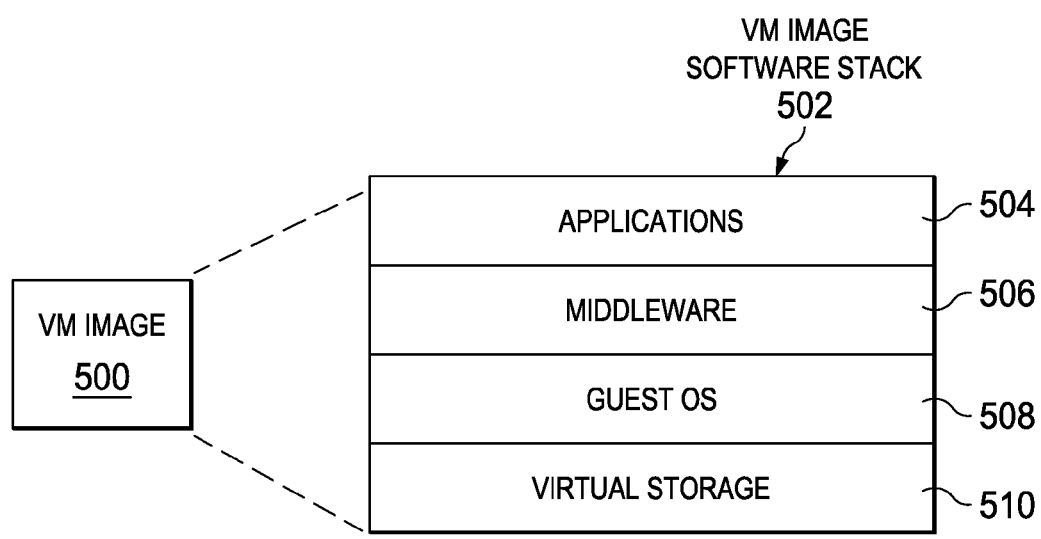
FIG. 5 is a diagram illustrating an example of a virtual machine image in accordance with an illustrative embodiment.

With reference now to FIG. 5, a diagram illustrating an example of a virtual machine image is depicted in accordance with an illustrative embodiment. Virtual machine image 500 may be, for example, virtual machine image 220 in FIG. 2. Virtual machine image 500 comprises virtual machine image software stack 502. Virtual machine image software stack 502 is a collection of a plurality of software components that comprises the functionality of virtual machine image 500.

In this example, virtual machine image software stack 502 includes applications 504, middleware 506, guest operating system 508, and virtual storage 510. However, it should be noted that virtual machine image software stack 502 may include fewer or more software components than shown. Applications 504 are a set of one or more software applications that allows a user of virtual machine image 500 to perform one or more tasks. For example, applications 504 may be, for example, a tax return preparation application and a financial spreadsheet application that allow the user of virtual machine image 500 to enter data into a set of tax forms for filing a tax return.

Middleware 506 provides services to applications 504 beyond those available from guest operating system 508. For example, middleware 506 may mediate communication between the different applications. Guest operating system 508 controls functionality of the different components of virtual machine image software stack 502 and the hardware resources used by the different components of virtual machine image software stack 502. Virtual storage 510 provides the virtual data storage capability of virtual machine image 500.

Figure 6:
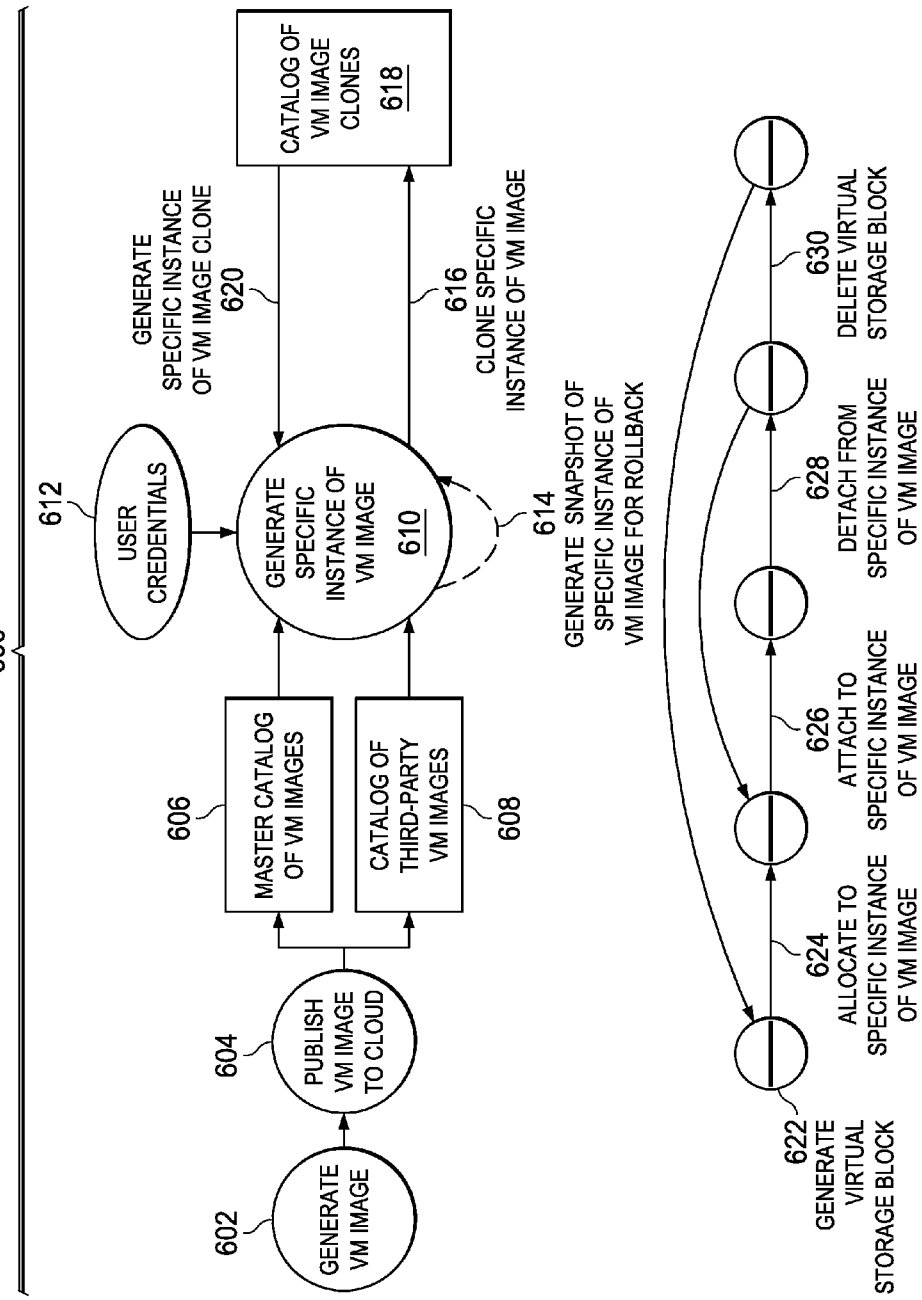
FIG. 6 is a diagram illustrating an example of a lifecycle of a virtual machine image in accordance with an illustrative embodiment.

With reference now to FIG. 6, a diagram illustrating an example of a lifecycle of a virtual machine image is depicted in accordance with an illustrative embodiment. Virtual machine image lifecycle 600 is a lifecycle of a virtual machine image, such as, for example, virtual machine image 500 in FIG. 5. Virtual machine image lifecycle 600 may be managed by a virtual machine image manager located in a data processing system, such as virtual machine image manager 218 located in data processing system 200 in FIG. 2.

In the illustrative example of virtual machine image lifecycle 600, the virtual machine image manager generates the virtual machine image at 602. Then, the virtual machine image manager publishes the virtual machine image to a cloud computing environment at 604. The cloud computing environment may be, for example, cloud computing environment 300 in FIG. 3. The virtual machine image manager may publish the virtual machine image to a master catalog of virtual machine images at 606 and/or publish the virtual machine image to a catalog of third-party virtual machine images at 608.

Afterward, the virtual machine image manager generates a specific instance of the virtual machine image at 610. The specific instance of the virtual machine image may be, for example, specific instance of a virtual machine image 226 in FIG. 2. The virtual machine image manager may generate the specific instance of the virtual machine image based on, for example, input by a particular user wanting to perform a specific task within the cloud computing environment. In addition, virtual machine image manager required the user to provide user credentials at 612 in order to generate the specific instance of the virtual machine image for the user.

Further, the virtual machine image manager generates a snapshot of the specific instance of the virtual machine image for rollback at 614. In other words, the virtual machine image manager generates the snapshot of the specific instance of the virtual machine image just in case the specific instance of the virtual machine image becomes corrupted and/or unusable. Furthermore, the virtual machine image manager clones the specific instance of the virtual machine image at 616 and publishes the clone of the specific instance of the virtual machine image to a catalog of virtual machine image clones at 618. Additionally, the virtual machine image manager generates a specific instance of a virtual machine image clone at 620.

Also in this illustrative example of virtual machine image lifecycle 600, the virtual machine image manager generates a virtual storage block at 622. Then at 624, the virtual machine image manager allocates the virtual storage block to a specific instance of a virtual machine image, such as the specific instance of the virtual machine image generated at 610. Afterward, the virtual machine image manager attaches the virtual storage block to the specific instance of the virtual machine image at 626. Later, the virtual machine image manager detaches the virtual storage block from the specific instance of the virtual machine image at 628. Further, the virtual machine image manager deletes the virtual storage block at 630.

Figure 7:
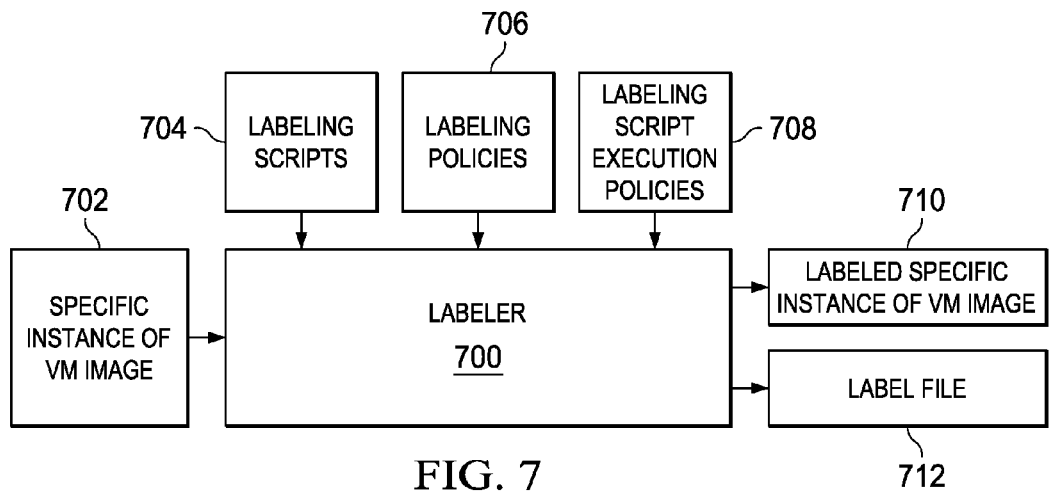
FIG. 7 is a diagram illustrating a labeler in accordance with an illustrative embodiment.

With reference now to FIG. 7, a diagram illustrating a labeler is depicted in accordance with an illustrative embodiment. Labeler 700 may be, for example, labeler 222 in FIG. 2. Labeler 700 labels sensitive data contained within one or more software components of a software stack installed on a virtual machine image, such as specific instance of virtual machine image 702. Specific instance of virtual machine image 702 may be, for example, specific instance of a virtual machine image 226 in FIG. 2.

Labeler 700 includes labeling scripts 704, labeling policies 706, and labeling script execution policies 708, such as labeling scripts 228, labeling policies 230, and labeling script execution policies 232 in FIG. 2. Labeling scripts 228 may include a list of paths to and/or locations of sensitive data contained within each software component of the software stack in specific instance of virtual machine image 702. Labeling scripts 228 define types of sensitive data using, for example, an extensible markup language. As a result, labeling scripts 228 are able to discover installation paths, files, and presence or absence of particular sensitive data items within, for example, data caches or system logs. Further, labeling scripts 228 generate an appropriate sensitivity level label for each identified sensitive data item and each path to the locations of the identified sensitive data items when applied to specific software components of the software stack in specific instance of virtual machine image 702.

Labeling policies 706 define the particular sensitivity levels associated with each type of sensitive data item. For example, labeling policies 706 may define a password data item as having a high sensitivity level, whereas a system log data item may have a medium sensitivity level. Labeling policies 706 may define the particular sensitivity levels associated with each type of sensitive data item using, for example, extensible markup language or comma-separated values.

For each particular software component of the software stack installed on specific instance of virtual machine image 702, at least one labeling script exists for that particular software component. Labeling scripts 704 are executable code that are executed for a particular virtual machine image or instance based on specified labeling script execution policies, such as labeling script execution policies 708. Labeling script execution policies 708 specify an order of execution for labeling scripts 704 based on identified labeling dependencies between the software components of the software stack installed on specific instance of virtual machine image 702. The identified labeling dependencies may be represented by a directed acyclic graph, for example.

Some labeling scripts in labeling scripts 704 must be executed, for example, in a specified order, which is a total dependent order of execution. For example, labeling script execution policies 708 may specify that if labeling script LS(1) fails or throws an exception, then labeling script execution policies 708 specify that the execution of labeling script LS(2) is to be aborted. In other words, the labeling script execution policy of <LS(1),LS(2)> is a total dependent order of execution policy. In contrast, some labeling scripts may be executed in any order, which is a partial dependent order of execution.

Each labeling script in labeling scripts 704 determines a location of each particular data item type, determines whether each particular data item type and corresponding values need to be labeled, and, if labeled, which sensitivity level label is to be applied to that particular data item type. Labeling scripts 704 embed the sensitivity level labels in specific instance of virtual machine image 702 by attaching the labels to the sensitive data items and updating specific instance of virtual machine image 702 to form labeled specific instance of virtual image 710. Alternatively, labeling scripts 704 may utilize, for example, a label file, such as label file 712, to store the associations between each particular identified sensitive data item and its respective sensitivity level label. A virtual machine image manager, such as virtual machine image manager 218 in FIG. 2, may provide labeled specific instance of virtual image 710 and/or label file 712 to a sanitizer at a later point in time so that the sanitizer can identify the labeled sensitive data items and sanitize them. The sanitizer may be, for example, sanitizer 224 in FIG. 2.

Labeler 700 executes labeling scripts 704 for the operating system in the order specified by labeling script execution policies 708. Based on the order of execution, labeler 700 executes labeling script LS(j) if the conditions in labeling script execution policies 708 evaluate to true for labeling script LS(j). For example, if an ordering condition AND a failure condition are true for labeling script LS(j). The ordering condition is true for labeling script LS(j) if all the labeling scripts LS(i), which are before labeling script LS(j) in the total dependent order of execution, have already been executed. Total dependent order of execution exists between labeling script LS(i) and labeling script LS(j) if a path from labeling script LS(i) to labeling script LS(j) exists in the directed acyclic graph of labeling dependencies. In contrast, labeling script LS(i) and labeling script LS(k) are in partial dependent order of execution if no direct path exists between LS(i) and LS (k) in the directed acyclic graph of labeling dependencies.

The failure condition is true for labeling script LS(j) if all the labeling scripts LS(i), which preceed labeling script LS(j) in total dependent order of execution, have been successfully executed. In other words, no failure or exception is raised during execution of labeling scripts LS(i). The failure condition also is true for labeling script LS(j) if labeling scripts LS(i+m) to LS(i+n), which preceed labeling script LS(j) in total dependent order of execution, failed to execute or led to an exception AND labeling script execution policies 708 specify directly or indirectly that execution of labeling script LS(j) can proceed in the event of such failures or exceptions. It should be noted that "m" is greater than or equal to "n" above.

Figure 8:
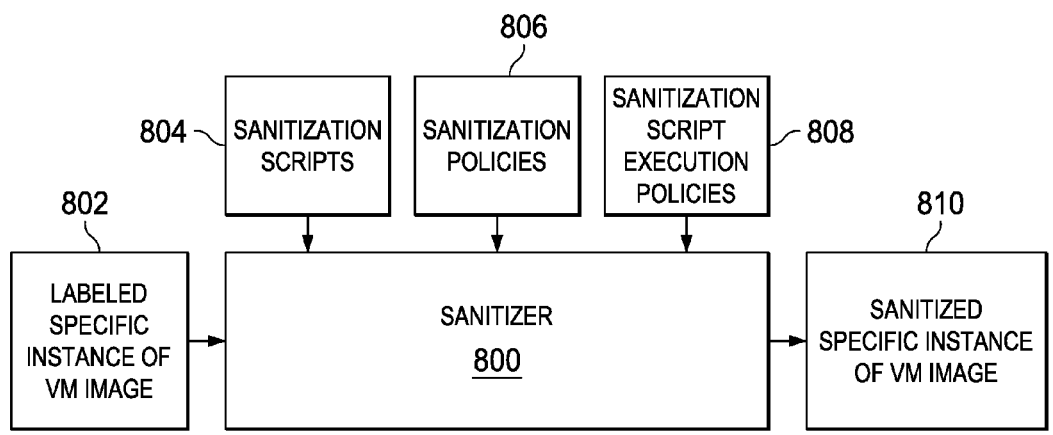
FIG. 8 is a diagram illustrating a sanitizer in accordance with an illustrative embodiment.

With reference now to FIG. 8, a diagram illustrating a sanitizer is depicted in accordance with an illustrative embodiment. Sanitizer 800 may be, for example, sanitizer 224 in FIG. 2. Sanitizer 800 sanitizes sensitive data contained within one or more software components of a software stack installed in a labeled virtual machine image, such as labeled specific instance of virtual machine image 802.

Sanitizer 800 includes sanitization scripts 804, sanitization policies 806, and sanitization script execution policies 808, such as sanitization scripts 234, sanitization policies 236, and sanitization script execution policies 238 in FIG. 2. Sanitization scripts 804 are programming language developed in, for example, Perl script, Python script, shell script, or any other programming language. Sanitization scripts 804 apply sanitization policies 806 in order to sanitize labeled sensitive data located within one or more software components of a software stack in labeled specific instance of virtual machine image 802. As a result, sanitization scripts 804 output sanitized specific instance of virtual machine image 810. In addition, sanitization scripts 804 also may update a sanitization history of sanitized specific instance of virtual machine image 810 either locally or remotely and update labeling information located in a label file, such as label file 712 in FIG. 7, associated with the specific instance of the virtual machine image. Further, sanitization scripts 804 may set the next sanitization process, event, and/or time if it is a regularly scheduled process.

Sanitization policies 806 specify sanitization action types and sanitization action details. Sanitization action types may include, for example, a delete action, an overwrite action, an encrypt action, and a backup deleted or overwritten data action. Sanitization action details may specify, for example, overwrite a particular sensitive data item type with a particular value and encrypt another particular sensitive data item type with a particular cryptographic key.

A sanitization policy in sanitization policies 806 may take the form of <sensitive data item type, associated sensitivity level label, and corresponding sanitization action type>, for example. Sanitization policies 806 also may specify time of sanitization, offline or online sanitization, events that trigger the sanitization process, and authorized credentials to initiate a sanitization process. A sanitization policy may be developed as an extension of the open virtualization format for a specific instance of virtual machine image or for a composite virtual machine image.

For each particular software component of the software stack installed on labeled specific instance of virtual machine image 802, at least one sanitization script exists for that particular software component. Sanitization scripts 804 are executable code that are executed for a particular virtual machine image or instance based on specified sanitization script execution policies, such as sanitization script execution policies 808. Sanitization script execution policies 808 specify an order of execution for sanitization scripts 804 based on identified sanitization dependencies between the software components of the software stack installed on labeled specific instance of virtual machine image 802. The identified sanitization dependencies may be represented by a directed acyclic graph, for example.

Some sanitization scripts in sanitization scripts 804 must be executed, for example, in a specified order, which is a total dependent order of execution. For example, sanitization script execution policies 808 may specify that if sanitization script SS(1) fails or throws an exception, then sanitization script execution policies 808 specify that the execution of sanitization script SS(2) is to be aborted. In other words, the sanitization script execution policy of <SS(1),SS(2)> is a total dependent order of execution policy. In contrast, some sanitization scripts may be executed in any order, which is a partial dependent order of execution.

Each sanitization script in sanitization scripts 804 identifies labeled sensitive data items contained within software components of the software stack installed on labeled specific instance of virtual machine image 802. In addition, each sanitization script determines which sanitization action to perform on a labeled sensitive data item based on a corresponding sanitization policy that maps a particular sensitivity level label to a particular sanitization action for sanitizing the sensitive data item.

Sanitizer 800 executes sanitization scripts 804 for the operating system in the order specified by sanitization script execution policies 808. Based on the order of execution, sanitizer 800 executes sanitization script SS(j) if the conditions in sanitization script execution policies 808 evaluate to true for sanitization script SS(j). For example, if an ordering condition AND a failure condition are true for sanitization script SS(j). The ordering condition is true for sanitization script SS(j) if all the sanitization scripts SS(i), which are before sanitization script SS(j) in the total dependent order of execution, have already been executed. Total dependent order of execution exists between sanitization script SS(i) and sanitization script SS(j) if a path from SS(i) to SS(j) exists in the directed acyclic graph of sanitization dependencies. In contrast, sanitization script SS(i) and sanitization script SS(k) are in partial dependent order of execution if no direct path exists between SS(i) and SS(k) in the directed acyclic graph of sanitization dependencies.

The failure condition is true for sanitization script SS(j) if all the sanitization scripts SS(i), which preceed sanitization script SS(j) in total dependent order of execution, have been successfully executed. In other words, no failure or exception is raised during execution of sanitization scripts SS(i). The failure condition also is true for sanitization script SS(j) if sanitization scripts SS(i+m) to SS(i+n), which preceed sanitization script SS(j) in total dependent order of execution, failed to execute or led to an exception AND sanitization script execution policies 808 specify directly or indirectly that execution of sanitization script SS(j) can proceed in the event of such failures or exceptions. It should be noted that "m" is greater than or equal to "n" above.

With reference now to FIG. 9, a diagram illustrating an example of a virtual machine image labeling and sanitization process is depicted in accordance with an illustrative embodiment. Virtual machine image labeling and sanitization process 900 may be performed by a virtual machine image manager within a computer system, such as, for example, virtual machine image manager 218 within data processing system 200 in FIG. 2. First, the virtual machine image manager generates a virtual machine image at 902. Then, the virtual machine image manager labels and sanitizes the virtual machine image at 904. The virtual machine image manager may utilize a labeler module and a sanitizer module, such as labeler 222 and sanitizer 224 in FIG. 2, to perform the labeling and sanitization processes on each of the software components of a software stack installed on the virtual machine image.

Afterward, the virtual machine image manager publishes the virtual machine image to a catalog on a cloud at 906. The cloud may be, for example, cloud computing environment 300 in FIG. 3. Subsequently, the virtual machine image manager generates a specific instance of the virtual machine image at 908 based on input by a user to perform a particular task in the cloud computing environment. Then, the virtual machine image manager labels and sanitizes the specific instance of the virtual machine image at 910 and delivers the labeled and sanitized specific instance of the virtual machine image to the user at 912.

Further, the virtual machine image manager generates a snapshot of the specific instance of the virtual machine image at 914. The virtual machine image manager may generate the snapshot of the specific instance of the virtual machine image for rollback purposes in case the specific instance of the virtual machine image fails or becomes corrupted. In addition, the virtual machine image manager labels and sanitizes the snapshot of the specific instance of the virtual machine image at 916 and stores the labeled and sanitized snapshot of the specific instance of the virtual machine image at 918.

Furthermore, the virtual machine image manager generates a clone of the specific instance of the virtual machine image at 920. The virtual machine image manager may generate the clone of the specific instance of the virtual machine image for other users to use. In addition, the virtual machine image manager labels and sanitizes the cloned specific instance of the virtual machine image at 922 and stores the labeled and sanitized clone of the specific instance of the virtual machine image at 924.

Moreover, the virtual machine image manager dynamically labels and sanitizes running instances of virtual machine image at 926 on, for example, a predetermined time interval basis. The predetermined time interval basis may be defined in terms of minutes, hours, days, weeks, for months. The virtual machine image manager also monitors the labeled and sanitized running instances of the virtual machine image at 928 to determine when the predetermined time interval has expired for each of the running instances of the virtual machine image.

Figure 10A:
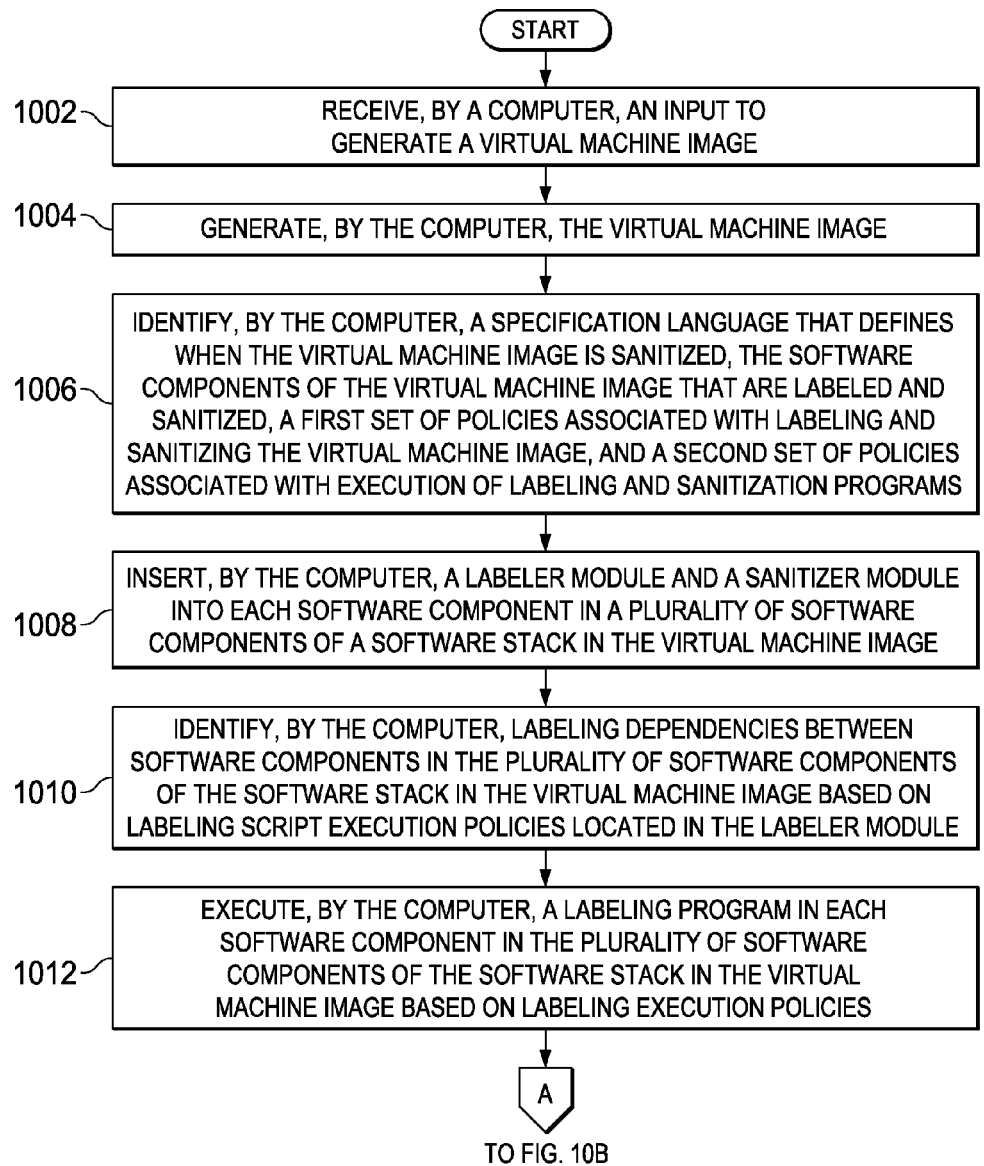
FIG. 10A and FIG. 10B are a flowchart illustrating a process for sanitizing a virtual machine image of sensitive data in accordance with an illustrative embodiment.
Figure 10B:
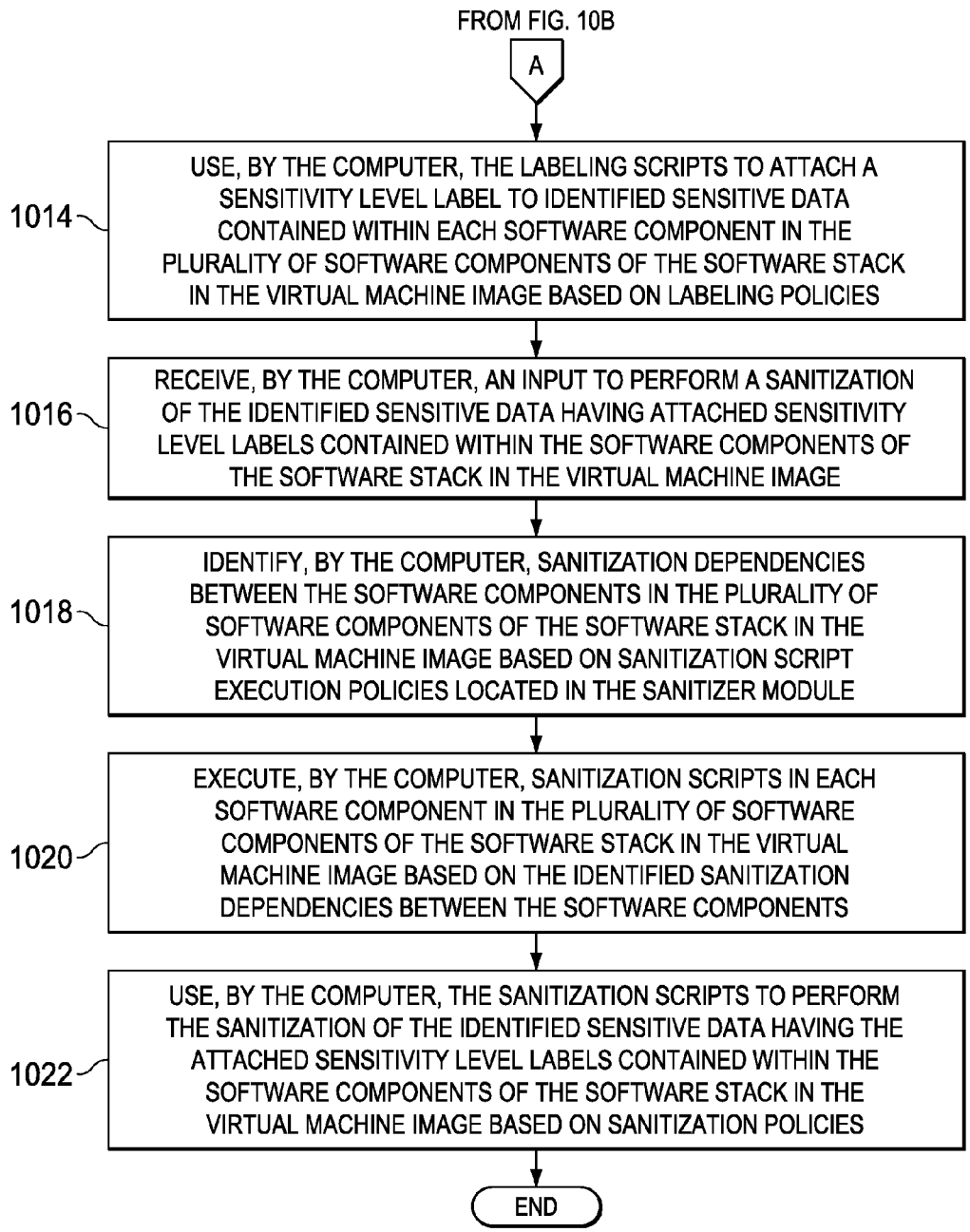

With reference now to FIG. 10A and FIG. 10B, a flowchart illustrating a process for sanitizing a virtual machine image of sensitive data is shown in accordance with an illustrative embodiment. The process shown in FIGS. 10A-10B may be implemented in a computer, such as, for example, data processing system 200 in FIG. 2.

The process begins when the computer receives an input to generate a virtual machine image, such as, for example, virtual machine image 220 in FIG. 2 (step 1002). Afterward, the computer generates the virtual machine image (step 1004). In addition, the computer identifies a specification language that defines when the virtual machine image is to be sanitized, the software components of the virtual machine image that are to be labeled and sanitized, a first set of policies associated with labeling and sanitizing the virtual machine image, and a second set of policies associated with execution of labeling and sanitization programs (step 1006). Subsequently, the computer inserts a labeler module and a sanitizer module, such as labeler 222 and sanitizer 224 in FIG. 2, into each software component in a plurality of software components of a software stack in the virtual machine image (step 1008).

Then, the computer identifies labeling dependencies between software components in the plurality of software components of the software stack in the virtual machine image based on labeling script execution policies, such as labeling script execution policies 232 in FIG. 2, located in the labeler module (step 1010). Subsequently, the computer executes labeling scripts, such as, for example, labeling scripts 228 in FIG. 2, in each software component in the plurality of software components of the software stack in the virtual machine image based on the identified labeling dependencies between the software components (step 1012). In addition, the computer may handle labeling execution failures during labeling of the virtual machine image. Further, the computer uses the labeling scripts to attach a sensitivity level label to identified sensitive data contained within each software component in the plurality of software components of the software stack in the virtual machine image based on labeling policies (step 1014). The labeling policies may be, for example, labeling policies 230 in FIG. 2.

Afterward, the computer receives an input to perform a sanitization of the identified sensitive data having attached sensitivity level labels contained within the software components of the software stack in the virtual machine image (step 1016). Alternatively, the computer may perform the sanitization on a predetermined time interval basis. Then, the computer identifies sanitization dependencies between the software components in the plurality of software components of the software stack in the virtual machine image based on sanitization script execution policies located in the sanitizer module (step 1018). Subsequently, the computer executes sanitization scripts, such as, for example, sanitization scripts 234 in FIG. 2, in each software component in the plurality of software components of the software stack in the virtual machine image based on the identified sanitization dependencies between the software components (step 1020). In addition, the computer may handle sanitization execution failures during sanitization of the virtual machine image. Further, the computer uses the sanitization scripts to perform the sanitization of the identified sensitive data having the attached sensitivity level labels contained within the software components of the software stack in the virtual machine image based on sanitization policies, such as, for example, sanitization policies 236 in FIG. 2 (step 1022). Thereafter, the process terminates.

Thus, illustrative embodiments provide a computer-implemented method, computer system, and computer program product for sanitizing a virtual machine image of sensitive data contained within a plurality of different software components of a software stack installed on the virtual machine image. The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of computer systems, computer implemented methods, and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for sanitizing a virtual machine image of sensitive data, the computer-implemented method comprising:
    inserting, by a computer, a labeler module and a sanitizer module into each software component in a plurality of software components of a software stack in the virtual machine image;
    identifying, by the computer, labeling dependencies and sanitization dependencies between the plurality of software components of the software stack in the virtual machine image based on labeling execution policies located in the labeler module and sanitization execution policies located in the sanitizer module, respectively;
    attaching, by the computer using the labeler module, a sensitivity level label of a plurality of sensitivity labels to identified sensitive data from the sensitive data contained within the plurality of software components of the software stack in the virtual machine image based on the identified labeling dependencies between the plurality of software components of the software stack; and
    responsive to the computer receiving an input to perform a sanitization of the identified sensitive data having attached sensitivity level labels contained within the plurality of software components of the software stack in the virtual machine image, performing, by the computer using the sanitizer module, the sanitization of the identified sensitive data having the attached sensitivity level labels contained within the plurality of software components of the software stack in the virtual machine image based on the identified sanitization dependencies between the plurality of software components of the software stack.

2. The computer-implemented method of claim 1, further comprising:
    executing, by the computer, a labeling program in the each software component in the plurality of software components of the software stack in the virtual machine image based on the labeling execution policies.

3. The computer-implemented method of claim 2, further comprising:
    identifying, by the computer, a partial order in the labeling execution policies, wherein the labeling program is executed in the partial order; and
    handling, by the computer, failures during labeling of the virtual machine image.

4. The computer-implemented method of claim 1, further comprising:
    executing, by the computer, a sanitization program in the each software component in the plurality of software components of the software stack in the virtual machine image based on the sanitization execution policies.

5. The computer-implemented method of claim 4, further comprising:
    identifying, by the computer, a partial order in the sanitization execution policies, wherein the sanitization program is executed in the partial order; and
    handling, by the computer, failures during sanitization of the virtual machine image.

6. The computer-implemented method of claim 1, wherein the sensitivity level label of the plurality of sensitivity labels is one of a high sensitivity level label, a medium sensitivity level label, and a low sensitivity level label.

7. The computer-implemented method of claim 1, wherein the plurality of software components of the software stack in the virtual machine image is an applications software component, a middleware software component, a guest operating system software component, and a virtual storage software component.

8. The computer-implemented method of claim 1, wherein the virtual machine image is one of a virtual machine instance, a virtual machine snapshot, or a virtual machine clone.

9. The computer-implemented method of claim 1, wherein the sanitization of the identified sensitive data having the attached sensitivity level labels is one of a delete sanitization action, an overwrite sanitization action, an encrypt sanitization action, and a backup deleted or overwritten data sanitization action.

10. The computer-implemented method of claim 1, wherein the computer identifies the labeling dependencies using a directed acyclic graph of labeling dependencies in the labeling execution policies and identifies the sanitization dependencies using a directed acyclic graph of sanitization dependencies in the sanitization execution policies.

* * * * *